(12) United States Patent
Wang

(10) Patent No.: US 10,142,549 B2
(45) Date of Patent: Nov. 27, 2018

(54) IMAGE CAPTURING APPARATUS AND IMAGE SMOOTH ZOOMING METHOD THEREOF

(71) Applicant: LUXVISIONS INNOVATION LIMITED, New Territories (HK)

(72) Inventor: Keng-Chun Wang, Taipei (TW)

(73) Assignee: LUXVISIONS INNOVATION LIMITED, New Territories (HK)

( * ) Notice: Subject to any disclaimer, the term of this patent is extended or adjusted under 35 U.S.C. 154(b) by 1 day.

(21) Appl. No.: 15/335,445

(22) Filed: Oct. 27, 2016

(65) Prior Publication Data

US 2018/0048825 A1 Feb. 15, 2018

(30) Foreign Application Priority Data

Aug. 15, 2016 (CN) .......................... 2016 1 0670071

(51) Int. Cl.
*G02B 13/02* (2006.01)
*G02B 27/00* (2006.01)
*H04N 5/232* (2006.01)
*H04N 5/225* (2006.01)

(52) U.S. Cl.
CPC ......... *H04N 5/23296* (2013.01); *G02B 13/02* (2013.01); *G02B 27/0081* (2013.01); *H04N 5/2258* (2013.01); *H04N 5/23232* (2013.01); *H04N 5/23258* (2013.01)

(58) Field of Classification Search
CPC .. H04N 5/2352; H04N 5/2252; H04N 5/2254; H04N 5/2259; H04N 5/23212; H04N 5/23293; H04N 5/23296; H04N 5/2353; H04N 5/374

USPC ................. 348/224.1, 225.1, 222.1; 382/164
See application file for complete search history.

(56) References Cited

U.S. PATENT DOCUMENTS

| | | | | |
|---|---|---|---|---|
| 2004/0027462 | A1* | 2/2004 | Hing | G01J 3/02 348/222.1 |
| 2004/0240052 | A1* | 12/2004 | Minefuji | G02B 13/0015 359/435 |
| 2005/0162534 | A1* | 7/2005 | Higashiyama | G02B 7/102 348/240.1 |
| 2013/0155312 | A1* | 6/2013 | Matsui | G02B 13/18 348/345 |
| 2013/0243313 | A1* | 9/2013 | Civit | G06T 5/002 382/164 |

(Continued)

*Primary Examiner* — Xi Wang
(74) *Attorney, Agent, or Firm* — JCIPRNET

(57) ABSTRACT

An image capturing apparatus and an image smooth zooming method thereof are provided. The image capturing apparatus includes a wide-angle lens and a telephoto lens having different sizes of field of view (FOV). In the method, a wide-view image and a tele-view image are respectively captured by using the wide-angle lens and the telephoto lens according to a zoom scale in a capturing setting. Ratios of the FOV sizes of the wide-angle lens and the telephoto lens to the zoom scale are respectively calculated and used to zoom the captured wide-view image and tele-view image so as to fit the zoom scale. The zoomed wide-view image and tele-view image are aligned according to a shift between view centers of the wide-angle lens and the telephoto lens. Finally, the zoomed and aligned wide-view image and tele-view image are overlapped to output an overlapped image fitting the zoom scale.

14 Claims, 6 Drawing Sheets

(56) References Cited

U.S. PATENT DOCUMENTS

2016/0050351 A1* 2/2016 Lee ..................... H04N 5/2252
348/221.1

* cited by examiner

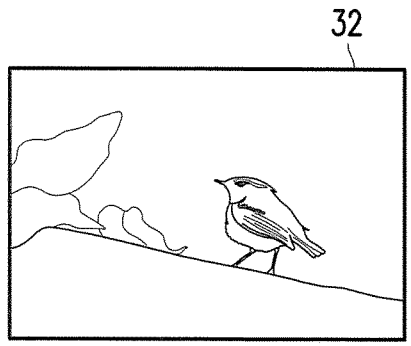
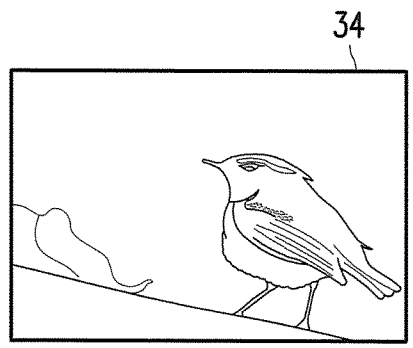
FIG. 3A        FIG. 3B
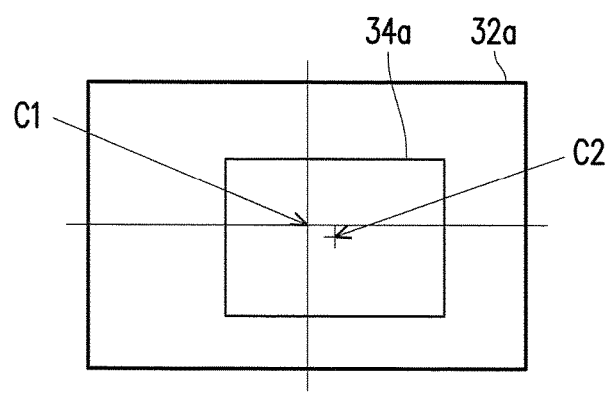
FIG. 3C

IMAGE CAPTURING APPARATUS AND IMAGE SMOOTH ZOOMING METHOD THEREOF

CROSS-REFERENCE TO RELATED APPLICATION

This application claims the priority benefit of China application no. 201610670071.1, filed on Aug. 15, 2016. The entirety of the above-mentioned patent application is hereby incorporated by reference herein and made a part of this specification.

BACKGROUND OF THE INVENTION

1. Field of the Invention

The invention relates to an image capturing apparatus and an image processing method thereof and more particularly relates to an image capturing apparatus and an image smooth zooming method thereof.

2. Description of Related Art

At present, the zoom modes of a digital camera in the market include optical zoom and digital zoom. The optical zoom changes the focal length of a lens to zoom captured images by moving the lens. The optical zoom is a method of capturing the image data with the same number of pixels when magnifying the image, and therefore the magnified image can still maintain the original resolution. On the contrary, the digital zoom directly crops a portion of the original image, and then enlarges the portion and displays the enlarged portion on the screen. Although both zoom modes can provide magnifying effect of solid images, only optical zoom can still maintain the original optical resolution and image quality. Digital zoom produces an image of lower optical resolution since the number of pixels decreases with the enlargement of the image.

Optical zoom lens needs space to move lens elements of an optical lens and the lens size is relatively large, and therefore the configuration is not suitable for mobile phones, tablets or other thin devices. To make a thin device also have a better zoom effect, some products currently in the market may use dual lenses. A wide-angle lens having a wider field of view (FOV) and a telephoto lens having a narrower FOV are both deposited on one apparatus to simultaneously capture wider view images and narrower view images. One of the images captured by the two lenses is selected for zooming according to user's magnification adjustment, and finally a magnified image desired by the user is provided.

However, a dual lens camera has a problem of scrambled images when switching between the images described above, which results in non-smooth image zooming. In addition, to provide the dual-lens camera with an anti-handshake function, both lenses are required to be disposed with anti-handshake assemblies. As a result, not only the manufacturing cost rises, but also the shake-reducing effect is not notable.

SUMMARY OF THE INVENTION

The invention provides an image smooth zooming method and an image capturing apparatus thereof. The image smooth zooming effect is achieved by zooming, aligning and overlapping the images captured by a wide-angle lens and a telephoto lens.

In the present invention, an image smooth zooming method adapted for an image capturing apparatus having a wide-angle lens and a telephoto lens is provided. In the method, a wide-view image and a tele-view image are captured by a wide-angle lens and a telephoto lens according to a capturing setting, wherein the capturing setting comprises a zoom scale. Next, ratios of the field of view (FOV) sizes of the wide-angle lens and the telephoto lens to the zoom scale are calculated respectively and used to zoom the captured wide-view image and tele-view image so as to fit the zoom scale. Then, the zoomed wide-view image and tele-view image are aligned according to a shift between view centers of the wide-angle lens and the telephoto lens. Finally, the zoomed and aligned wide-view image and tele-view image are overlapped to output an overlapped image fitting the zoom scale.

The image capturing apparatus in the invention comprises a wide-angle lens, a telephoto lens, a storage apparatus and a processor, in which a FOV size of the wide-angle lens is larger than a FOV size of the telephoto lens. The storage apparatus stores a plurality of modules. The processor is coupled to the wide-angle lens, the telephoto lens and the storage apparatus, and configured to load and execute the modules stored in the storage apparatus. The modules comprise an image capturing module, an image zooming module, an image aligning module and an image overlapping module. The image capturing module controls the wide-angle lens and the telephoto lens to capture a wide-view image and a tele-view image respectively according to a capturing setting, wherein the capturing setting includes a zoom scale. The image zooming module calculates ratios of the FOV sizes of the wide-angle lens and the telephoto lens to the zoom scale respectively and uses the ratios to zoom the captured wide-view image and tele-view image so as to fit the zoom scale. The image aligning module aligns the zoomed wide-view image and tele-view image according to a shift between view centers of the wide-angle lens and the telephoto lens. The image overlapping module overlaps the zoomed and aligned wide-view image and tele-view image to output an overlapped image fitting the zoom scale.

In view of the above, the image capturing apparatus and the image smooth zooming method proposed in the present invention use the wide-angle lens and the telephoto lens to capture clear images with different FOVs, appropriately zoom the images according to a zoom scale adjusted by a user, and then align and overlap the zoomed images according to a shift between the lens view centers. In this way, clear image with different zoom scales are provided and the image smooth zooming effect is also realized.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A through 3C are schematic diagrams illustrating a shift between view centers of the wide-angle lens and telephoto lens according to an embodiment of the present invention.

DESCRIPTION OF THE EMBODIMENTS

Figure 1:
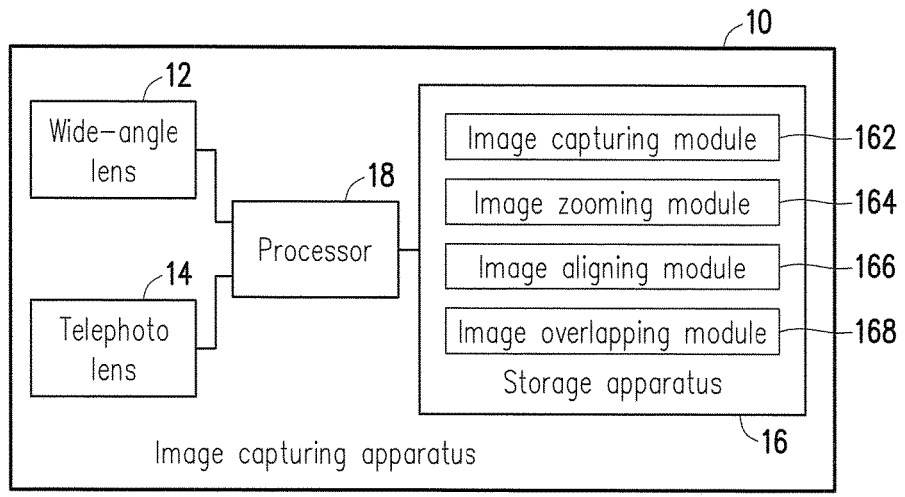
FIG. 1 is a block diagram of the image capturing apparatus according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

A wide-angle lens and a telephoto lens which have different field of view (FOV) sizes are used in a dual lens camera to capture clear images with different FOV sizes. The telephoto lens may be used for capturing a narrow-angle image, but with more details, and the wide-angle lens may be used for capturing a wide-angle image, but with fewer details. Based on a characteristic of an overlap between the FOVs of two adjacent lenses, the present invention zooms the images captured by the two lenses according to a user's magnification adjustment after shake reduction, aligns two images according to a shift between view centers of two lenses, and overlaps the narrower FOV image with the wider FOV image. In this way, the present invention provides the clear images with different zoom scales and is able to ensure a smooth image display during the zooming process.

FIG. 1 is a block diagram of an image capturing apparatus according to one embodiment of the present invention. In the present embodiment, the image capturing apparatus 10 is, for example, a digital camera, a digital video camcorder or a camera deposited on a thin electrical apparatus with an image capturing feature such as a cellular phone, or a tablet computer, which is not limited by the invention. The image capturing apparatus 10 includes a wide-angle lens 12, a telephoto lens 14, a storage apparatus 16 and a processor 18, and functions thereof are respectively described below.

The wide-angle lens 12 and the telephoto lens 14 are, for example, deposited adjacent to each other on the same side and oriented in the same direction. The FOV sizes of the wide-angle lens 12 and the telephoto lens 14 are different but there is an overlapping region between the FOVs, and there is also a shift between the view centers. Each of the wide-angle lens 12 and the telephoto lens 14 includes an optical lens, a photosensitive element, an aperture, a shutter, etc., wherein a focal length of the wide-angle lens 12 is shorter than that of the telephoto lens 14 but the FOV size of wide-angle lens 12 is wider than that of the telephoto lens 14 for capturing a wider view image. For example, an aperture is deposited in a lens and used to control the incoming light flux of the lens, and a shutter is used to control the time length allowing the light to enter the lens. The photosensitive element is, for example, a charge coupled device (CCD), a complementary metal-oxide semiconductor (CMOS) or any other light sensitive devices adapted to sense light intensity entering a lens for generating an image.

The storage apparatus 16 may be one or a combination of a random access memory (RAM), a read-only memory (ROM), a flash memory, a hard drive or other similar devices, and the invention s not limited thereto. The storage apparatus 16 stores programs of an image capturing module 162, an image zooming module 164, an image aligning module 166 and an image overlapping module 168, which can be loaded and executed by the processor 18.

The processor 18 may be a central processing unit (CPU), a microprocessor, a digital signal processor (DSP), a programmable controller, an application specific integrated circuits (ASIC) or other similar devices or a combination of above-mentioned devices, but are not limited thereto. The processor 18 is coupled to the wide-angle lens 12, the telephoto lens 14 and the storage apparatus 16 and can load and execute the modules stored in the storage apparatus16 to implement the image smooth zooming method according to an embodiment of the present invention.

Figure 2:
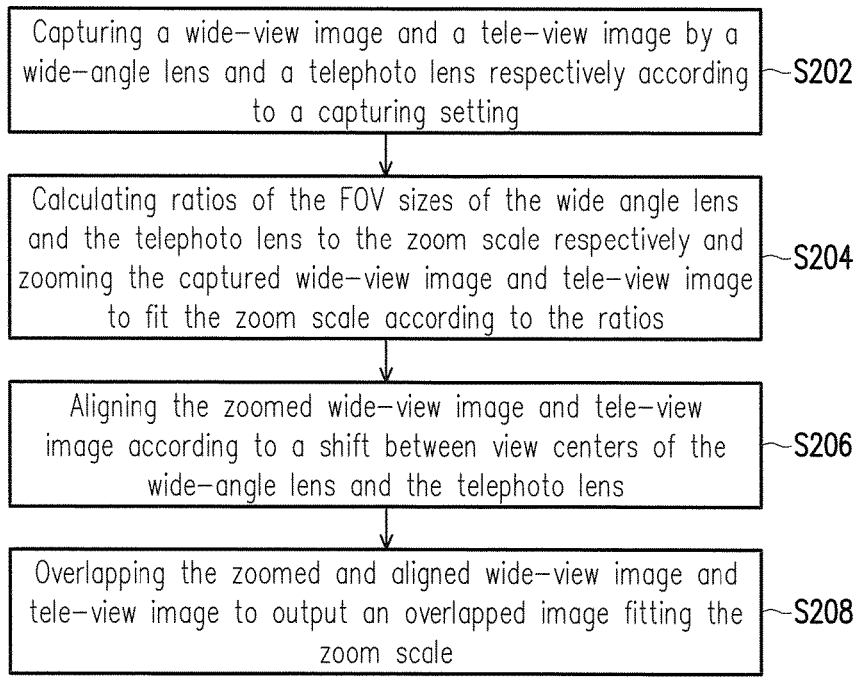
FIG. 2 is a flowchart illustrating a image smooth zooming method according to an embodiment of the invention.

FIG. 2 is a flowchart illustrating an image smooth zooming method according to an embodiment of the invention. With reference to FIG. 1 and FIG. 2, the method of the embodiment is adapted for the image capturing apparatus 10, and steps of the method of the embodiment are explained in detail below with reference to the components in the image capturing apparatus 10 of FIG. 1.

First, the processor 18 executes the image capturing module 162 to control the wide-angle lens 12 and the telephoto lens 14 to respectively capture a wide-view image and a tele-view image according to a capturing setting (step S202). In this step, the capturing setting may be a zoom scale which can be adjusted based on the user's zooming operation performed on the image capturing apparatus 10. The capturing setting may also include a view position or camera parameters such as aperture parameters, shutter parameters, white balance parameters, but the invention is not limited to thereto.

To be specific, the image capturing apparatus 10 may include physical buttons, a touch panel, a touch screen or other operating apparatuses (not shown), which can receive a user's adjusting operation to generate corresponding adjusting signals and transmit the same to the processor 18. The user's adjusting operation can be divided into adjustment of FOV size, adjustment of zoom view position, and simultaneous adjustment of the FOV size and the zoom view position.

In an embodiment, after receiving the adjusting signals, the processor 18 may execute the image capturing module 162 to adjust a zoom scale of the captured images according to the adjusting operation corresponding to the adjusting signals and save the adjusted zoom scale to the capturing setting. In an embodiment, after receiving the adjusting signals, the processor 18 may execute the image capturing module 162 to adjust a view position of the captured images according to the adjusting operations and save the adjusted view position to the capturing setting. In another embodiment, after receiving the adjusting signals, the processor 18 may execute the image capturing module 162 to simultaneously adjust a zoom scale and a view position.

In an embodiment, the view position described above may be determined by a shift in X/Y-axis direction adjusted manually by a user. To be specific, the view position is predetermined as a view center of the wide-angle lens 12 and can be moved from the view center toward a direction set by the user by setting a shift in X/Y-axis direction. An allowable shift amount in X/Y axis direction depends on a zoom scale. The smaller the zoom scale is, the larger the allowable shift amount is, and vice versa. According to another embodiment, the above-mentioned view position also may be determined by focused objects or focused regions detected by the image capturing apparatus 10. For example, a position of a center of a focused object or focused region is determined as the view position. Nevertheless, the invention is not limited to the foregoing.

Next, the processor 18 may execute the image zooming module 164 to calculate ratios of the field of view sizes of the wide-angle lens 12 and the telephoto lens 14 to the zoom scale respectively and use the ratios to zoom the captured wide-view image and tele-view image so as to fit the zoom scale (step S204).

For example, if the FOV size of a wide-angle lens is 80 degrees and the FOV size of a telephoto lens is 40 degrees, the image capturing apparatus can calculate the ratio of the FOV size of the wide-angle lens to the zoom scale as 4:3 when the zoom scale adjusted by the user is 60 degrees, and then zoom the captured wide-view image according to the ratio so as to fit the zoom scale. Also, the image capturing apparatus can calculate the ratio of the FOV size of the telephoto lens to the zoom scale as 3:2 and then zoom the captured tele-view image according to the ratio so as to fit the zoom scale.

Thereafter, the processor 18 may execute the image aligning module 166 to align the wide-view image and tele-view image zoomed by the image zooming module 164 according to a shift between view centers of the wide-angle lens 12 and the telephoto lens 14 (step S206). As mentioned above, although the wide-angle lens 12 and the telephoto lens 14 have FOVs with different sizes but with an overlap, there may also be a shift between the view centers. The shift may be obtained through an image rectification procedure and recorded in the apparatus by the manufactures fabricating the image capturing apparatus 10 before the image capturing apparatus 10 is rolled out. In particular, the shift is the basis that how the image capturing apparatus 10 aligns the images captured by the wide-angle lens 12 and the telephoto lens 14 respectively in the following-up process and the shift also may be obtained from the image rectification procedure executed by a user himself/herself, and the invention is not limited thereto. The above-mentioned image rectification procedure may, for example, use the wide-angle lens 12 and the telephoto lens 14 to capture the same image for rectification at the same time and the image for rectification may include frames, lines, indexes or icons for positioning. When the wide-angle lens 12 and the telephoto lens 14 capture the image for rectification at the same time, the image capturing apparatus 10 can compare the positions of the corresponding objects in the FOVs of the two images and accordingly calculate a shift between view centers of the wide-angle lens 12 and the telephoto lens 14, and then use the calculated shift to align the zoomed wide-view image and tele-view image.

For example, FIGS. 3A through 3C are schematic diagrams illustrating a shift between view centers of the wide-angle lens and telephoto lens according to an embodiment of the present invention. FIG. 3A represents the wide-view image 32 with a wider FOV captured by a wide-angle lens and FIG. 3B represents the tele-view image 34 with a narrower FOV captured by a telephoto lens. The relation between the FOVs and view centers of the two images is depicted in FIG. 3C, wherein FOV 32a represents the FOV of the wide-angle lens whose view center is C1; and FOV 34a represents the FOV of the telephoto lens whose view center is C2. The distance between the view centers C1 and C2 is a shift between the view centers of the wide-angle lens and telephoto lens. According to the shift, the image capturing apparatus 10 can fill the wide-view image and the tele-view image in the FOV 32a and the FOV 34a respectively and then align the wide-view image and the tele-view image.

Finally, the processor 18 may execute the image overlapping module 168 to perform image overlapping on the wide-view image and tele-view image which are zoomed and aligned by the image zooming module 164 and the image aligning module 166 respectively so as to output an overlapped image fitting the zoom scale (step S208). In particular, the image overlapping module 168 may overlay the zoomed tele-view image on the zoomed wide-view image and perform alpha blending or seamless fusion on a region of a margin of the zoomed tele-view image and adjacent to the zoomed wide-view image so as to overlap the wide-view image and tele-view image.

Figure 4:
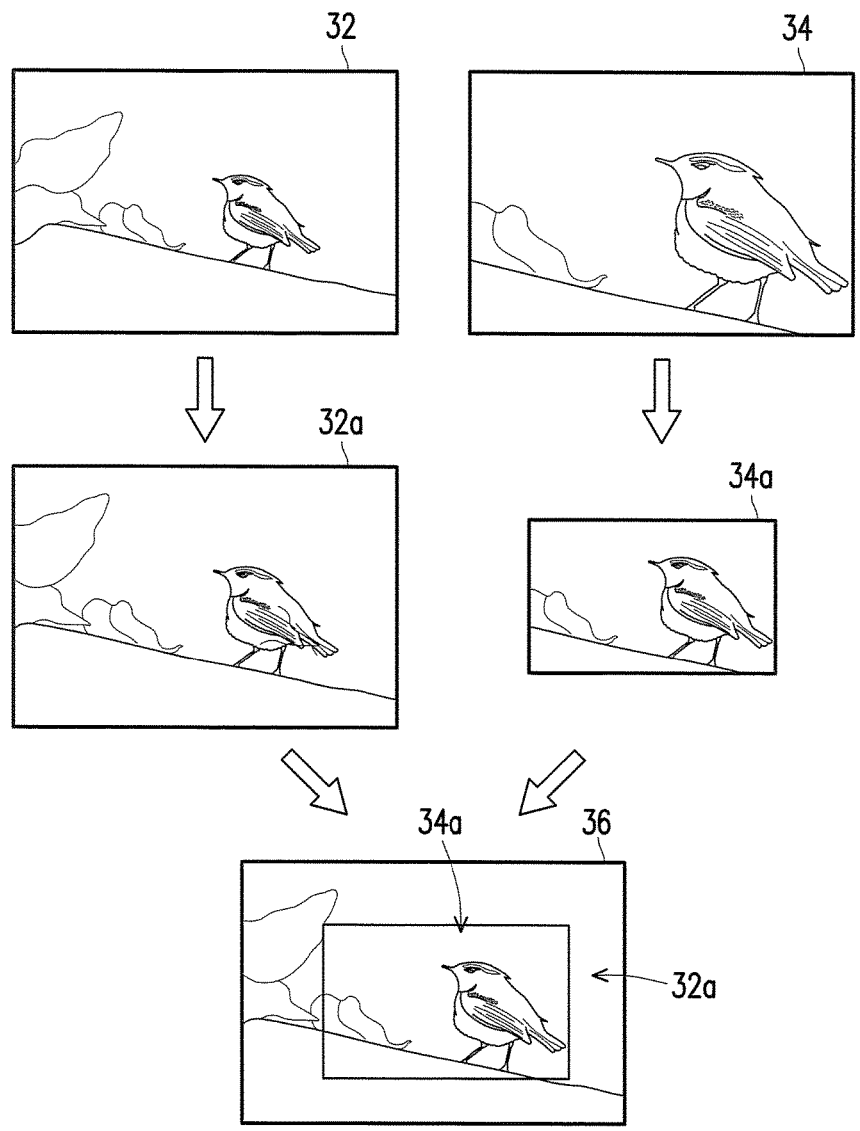
FIG. 4 is a schematic diagram illustrating an image smooth zooming method according to an embodiment of the invention.

For example, FIG. 4 is a schematic diagram illustrating an image smooth zooming method according to an embodiment of the invention. With reference to FIG. 4, the method in the present embodiment is to zoom the wide-view image 32 and the tele-view image 34 captured by a wide-angle lens and a telephoto lens according to a zoom scale adjusted by a user so as to obtain the zoomed wide-view image 32a and the zoomed tele-view image 34a. Then, the wide-view image and tele-view image zoomed by the image zooming module 164 are aligned and overlapped according to a shift between view centers of the wide-angle lens and the telephoto lens. The zoomed tele-view image 34a is overlaid on the zoomed wide-view image 32a according to the above-mentioned shift and the overlapped image 36 is generated after an alpha blending process.

In this way, the image capturing apparatus 10 in the present embodiment can combine the advantages of a wider FOV of the wide-view image and more details of the tele-view image, so as to provide clear images with different zoom scales and enable the smooth image display during the zooming process.

On the other hand, for the problem of image shaking of the image capturing apparatus 10 caused by a user's handshake in capturing the images, the present invention extends the image smooth zooming method of the aforementioned embodiment to further detect displacements and directions thereof of the two lenses during capturing the images, accordingly capture reduced FOV images toward a reverse direction of the displacement direction, align the captured images, and overlays the image with the narrower FOV on the image with the wider FOV. In this way, image shaking can be decreased while providing images with the different zoom scales.

Figure 5:
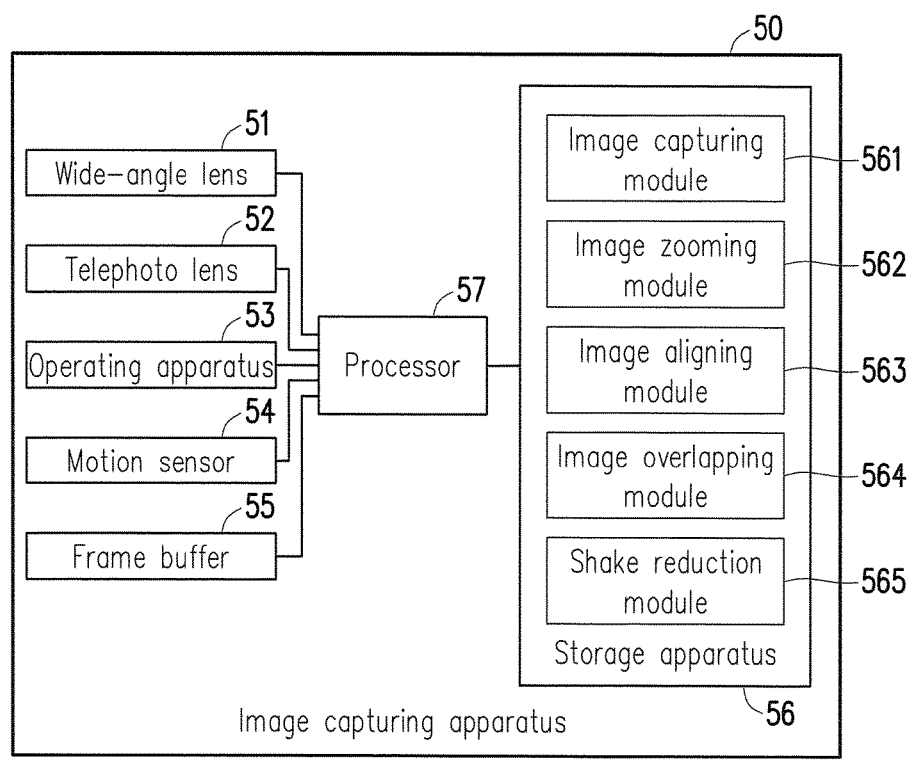
FIG. 5 is a block diagram of the image capturing apparatus according to one embodiment of the present invention.

In detail, FIG. 5 is a block diagram of the image capturing apparatus according to one embodiment of the present invention. The image capturing apparatus 50 in the present embodiment may be a digital camera, a digital video camcorder or a camera deposited on a thin electrical apparatus with an image capturing feature such as a cellular phone, a tablet computer, and so on, which is not limited by the invention. The image capturing apparatus 50 includes a wide-angle lens 51, a telephoto lens 52, an operating apparatus 53, a motion sensor 54, a frame buffer 55, a storage apparatus 56 and a processor 57, but are not limited thereto. In particular, the types and functions of the wide-angle lens 51, the telephoto lens 52, the storage apparatus 56 and the processor 57 are the same as or similar to the wide-angle lens 12, the telephoto lens 14, the storage apparatus 16 and the processor 18 in the aforementioned embodiment, and therefore details thereof are not repeated hereinafter.

Different from the aforementioned embodiments, in the present embodiment, the image capturing apparatus 50 further includes the operating apparatus 53, the motion sensor 54 and the frame buffer 55. The operating apparatus 53 may be physical buttons, a touch panel, a touch screen or other apparatuses equipped with the capability of receiving or detecting a user's operation. However, the invention is not limited thereto. The operating apparatus 53 can receive a user's adjusting operation, generate corresponding adjusting signals, and transmit the same to the processor 57 for adjusting a zoom scale.

The motion sensor 54 may be, for example, an acceleration sensor, a G-sensor, a gyroscope, and so forth, or combinations thereof, but is not limited thereto.

The motion sensor 54 may be used to detect displacements (including the direction) of the wide-angle lens 51 and the telephoto lens 52 as the image capturing apparatus 50 captures the images and the detected displacements are provided to the processor 57 for shake reduction.

The frame buffer 55 may be one or a combination of a static RAM (SRAM), a dynamic random access memory (DRAM), a synchronous dynamic random access memory (SDRAM) or other memory devices adapted to temporarily store the images output from the processor 57, and the invention is not limited thereto.

It should be noted here, in addition to the programs of the image capturing module 562, the image zooming module 564, the image aligning module 566 and the image overlapping module 568 similar to the aforementioned embodiments, the storage apparatus 56 also stores the programs of the shake reduction module 565. The programs of the mentioned modules can be loaded by the processor 57 to execute the image smooth zooming method of the present invention.

Figure 6:
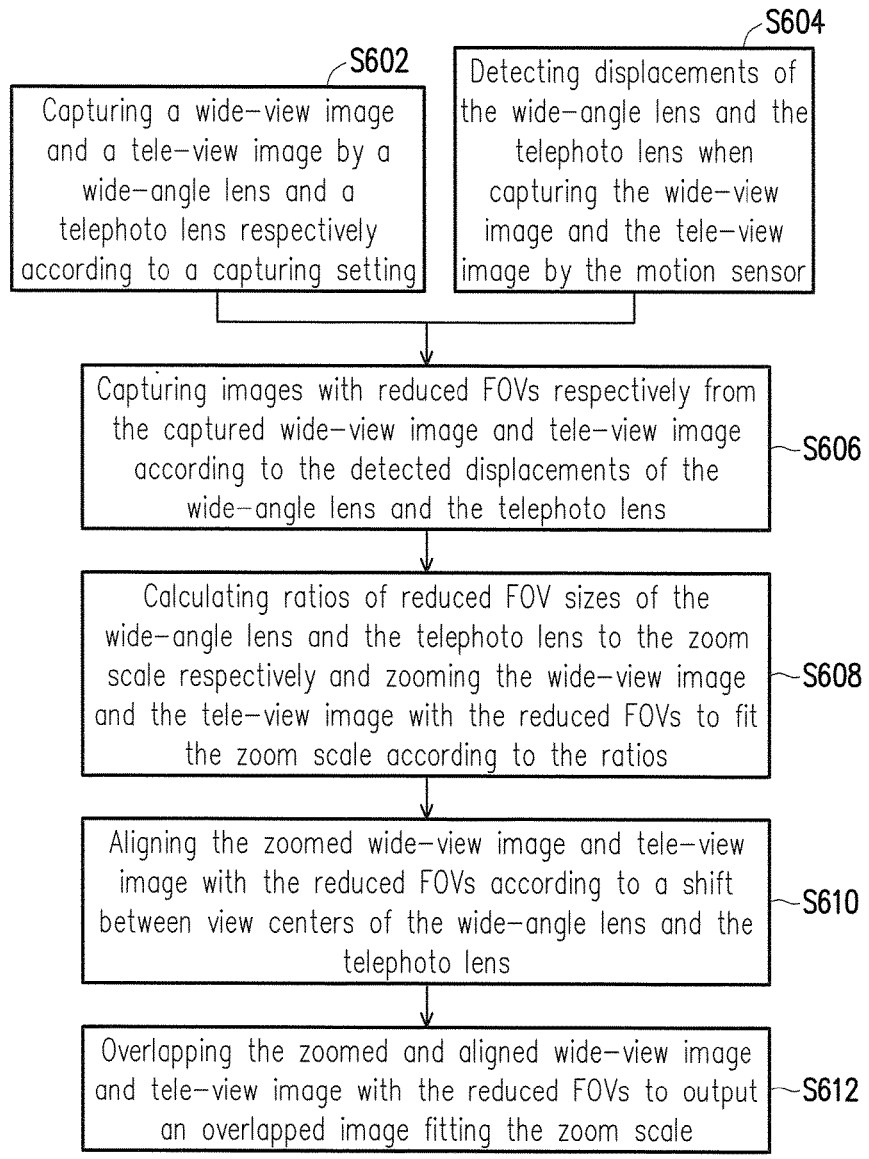
FIG. 6 is a flowchart illustrating a image smooth zooming method according to an embodiment of the invention.

Specifically, FIG. 6 is a flowchart illustrating an image smooth zooming method according to an embodiment of the invention. With reference to FIG. 5 and FIG. 6, the method of this embodiment is adapted for the image capturing apparatus 50, and steps of the method of this embodiment are explained in detail below with reference to the components in the image capturing apparatus 50 of FIG. 5.

First, the processor 57 executes the image capturing module 562 to control the wide-angle lens 51 and the telephoto lens 52 to respectively capture a wide-view image and a tele-view image according to a zoom scale in a capturing setting (step S602). The processor 57 also executes the image capturing module 562 to control the motion sensor 54 to detect displacements of the wide-angle lens 51 and the telephoto lens 52 when capturing a wide-view image and a tele-view image (step S604).

Next, the processor 57 may execute the shake reduction module 565 to capture an image with a reduced FOV respectively from the wide-view image and tele-view image captured by the wide-angle lens 51 and the telephoto lens 52 according to the displacements of the wide-angle lens 51 and the telephoto lens 52 detected by the motion sensor 54 (step S606), wherein the displacement of the above-mentioned reduced FOV is reverse to the detected displacement of the wide-angle lens 51 and the telephoto lens 52. In other words, a center of the reduced FOV is at the position where the view centers of the wide-angle lens 51 and the telephoto lens 52 are reversely shifted by the mentioned displacements. In brief, if the motion sensor 54 detects an upward displacement, it represents that the images captured by the wide-angle lens 51 and the telephoto lens 52 also shift upward, and therefore the shake reduction module 565 will move the reduce FOV downward to capture images so to reduce the influence resulting from the upward displacements of the wide-angle lens 51 and the telephoto lens 52 and to prevent the image from the dramatic shaking.

To be specific, in order to reduce image shaking due to handshake, an adjusting space for flexibly capturing the image is reserved in the wide-view image and the tele-view image respectively captured by the wide-angle lens 51 and the telephoto lens 52 in the present embodiment. It means there is a reserved space in the margin of the wide-view image and tele-view image and only the images with reduced FOV at the center are zoomed, aligned and overlapped in the following-up process. The range of reduced FOV changes along with the displacements of the wide-angle lens 51 and the telephoto lens 52 detected by the shake reduction module 565 and image shaking will be reduced by shifting the FOVs of the captured images.

Next, the processor 57 may execute the image zooming module 562 to calculate ratios of the reduced FOV sizes of the wide-angle lens 51 and the telephoto lens 52 to the zoom scale respectively and zoom the captured wide-view image and the tele-view image with the reduced FOVs to fit the zoom scale according to the ratios (step S608). This step is similar to the step S204 in the aforementioned embodiment and the only difference lies in that, in the present embodiment, the wide-view image and tele-view image with reduced FOVs are used for zooming, and therefore the sizes of the reduced FOVs are adapted by the image zooming module 562 to calculate the ratio of FOV sizes to the zoom scale so as to make the zoomed images fit the zoom scale.

For example, if the FOV size of a wide-angle lens is 80 degrees, the reduced FOV of the wide-angle lens is 75 degrees, the FOV size of a telephoto lens is 40 degrees, and the reduced FOV of the telephoto lens is 35 degrees, an image capturing apparatus can calculate the ratio of the reduced FOV size of the wide-angle lens to the zoom scale as 5:4 when the zoom scale is 60 degrees, and zoom the wide-view image with the reduced FOV to fit the zoom scale according to the calculated ratio. Also, the image capturing apparatus can calculate the ratio of the reduced FOV size of the telephoto lens to the zoom scale as 7:12 and zoom the tele-view image with the reduced FOV to fit the zoom scale according to the calculated ratio.

Thereafter, the processor 57 may execute the image aligning module 563 to align the wide-view image and tele-view image with the reduced FOV zoomed by the image zooming module 562 according to a shift between view centers of the wide-angle lens 51 and the telephoto lens 52 (step S610). For example, the image zooming module 562 may write the zoomed wide-view image with the reduced FOV into the frame buffer 55, and adjust the center position of the zoomed tele-view image with the reduced FOV with respect to the center of the zoomed wide-view image with the reduced FOV according to a shift between view centers of the wide-angle lens 51 and the telephoto 52, and write the zoomed tele-view image with the reduced FOV into the frame buffer 55.

Finally, the processor 57 executes the image overlapping module 564 to overlap the wide-view image and the tele-view image with the reduced FOVs which are zoomed by the image zooming module 562 and aligned by the image aligning module 563 so as to output an overlapped image fitting the zoom scale (step S612). In particular, the image overlapping module 564 may overlay the tele-view image with the reduced FOV on the wide-view image with the reduced FOV and perform alpha blending or seamless fusion on an overlapping region between a margin of the tele-view image with the reduced FOV and an adjacent region of the wide-view image with the reduced FOV to overlap the wide-view image with the reduced FOV and the tele-view image with the reduced FOV.

Figure 7:
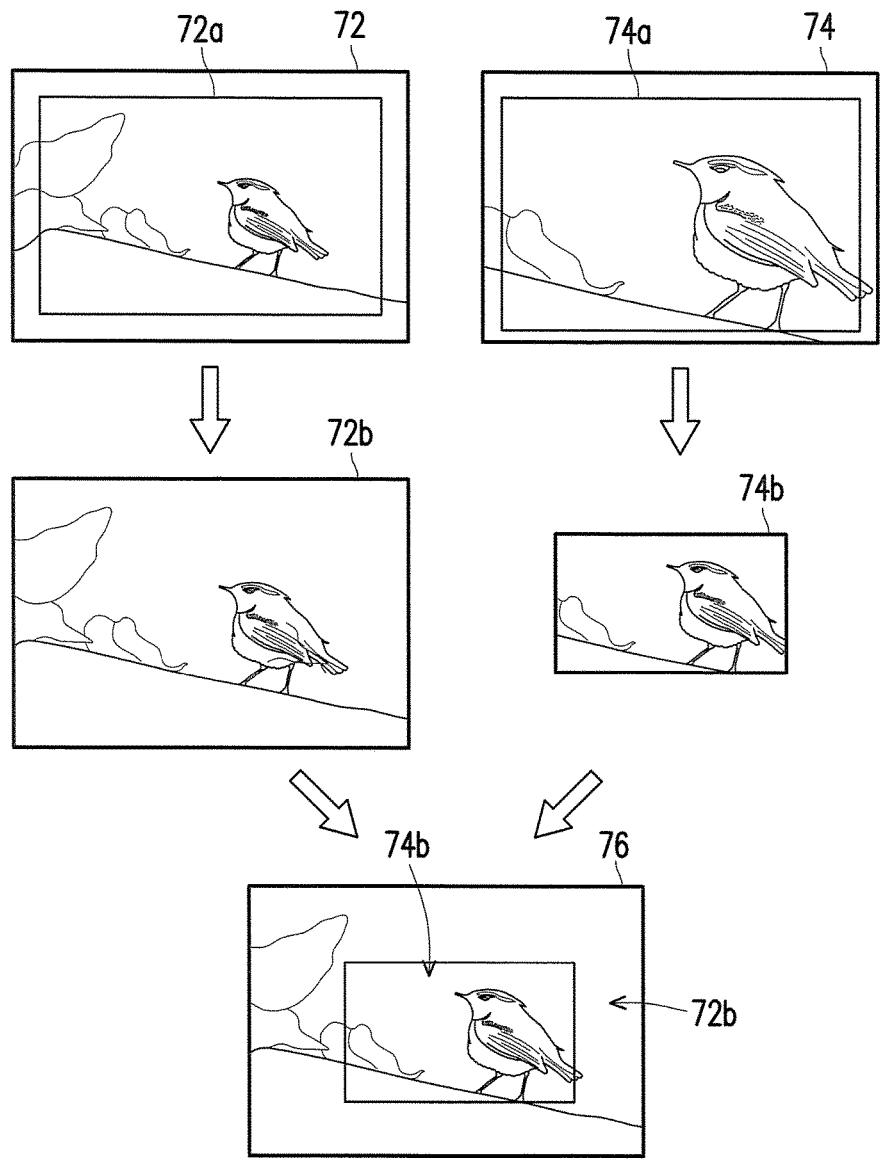
FIG. 7 is a schematic diagram illustrating an image smooth zooming method according to an embodiment of the invention.

For example, FIG. 7 is a schematic diagram illustrating an image smooth zooming method according to an embodiment of the invention. Referring to FIG. 7, the method in the present embodiment reserves a margin of the wide-view image 72 and a margin of the tele-view image 74 respectively captured by a wide-angle lens and a telephoto lens for shake-reducing effect and sets the reduced FOV 72a and the reduced FOV 74a both smaller than original FOVs. The image capturing apparatus may detect displacements of the wide-angle lens and the telephoto lens when capturing the wide-view image 72 and the tele-view image 74 and respectively shift the reduced FOV 72a and the reduced FOV 74a in the wide-view image 72 and the tele-view image 74 to capture images. Next, according to a zoom scale adjusted by a user, the image capturing apparatus may calculate a ratio of the reduced FOV 72a to the zoom scale and a ratio of the reduced FOV 74a to the zoom scale respectively. The image capturing apparatus may zoom the wide-view image with the reduced FOV 72a and zoom the tele-view image with the reduced FOV 74a respectively to obtain the zoomed wide-view image 72b with the reduced FOV and tele-view image 74b with the reduced FOV. Next, the zoomed wide-view image 72b with the reduced FOV and tele-view image 74b with the reduced FOV are aligned according to a shift between view centers of the wide-angle lens and the telephoto lens so as to be overlapped. In particular, the zoomed tele-view image 74b with the reduced FOV is overlaid on the zoomed wide-view image 72b with the reduced FOV and an overlapped image 76 is generated after alpha blending.

In summary, in the image capturing apparatus and the image smooth zooming method proposed in the present invention, images with different FOVs are captured by a wide-angle lens and a telephoto lens, and the captured images are zoomed according to a user's operation, aligned according to a shift between view centers of the lenses, and finally overlapped to generate a single clear image, such that an image smooth zooming effect is realized. In addition, the present invention further detects displacements of lenses in capturing the images, and accordingly captures the images with the reduced FOVs from images captured by the two lenses in a reverse direction so as to reduce image shaking due to handshake.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An image smooth zooming method adapted to an image capturing apparatus having a wide-angle lens and a telephoto lens, wherein a field of view (FOV) size of the wide-angle lens is larger than a FOV size of the telephoto lens, the image smooth zooming method comprising the following steps:
   capturing a wide-view image and a tele-view image by the wide-angle lens and the telephoto lens respectively according to a capturing setting, wherein the capturing setting comprises a zoom scale;
   detecting displacements of the wide-angle lens and the telephoto lens when capturing the wide-view image and the tele-view image by using a motion sensor;
   capturing images within reduced FOVs respectively from the captured wide-view image and tele-view image according to the detected displacements of the wide-angle lens and the telephoto lens, wherein centers of the reduced FOVs are at positions where the view centers of the wide-angle lens and the telephoto lens are reversely shifted by the displacements respectively;
   calculating ratios of the FOV sizes of the wide-angle lens and the telephoto lens to the zoom scale respectively and zooming the captured wide-view image and tele-view image to fit the zoom scale according to the ratios;
   aligning the zoomed wide-view image and tele-view image according to a shift between view centers of the wide-angle lens and the telephoto lens; and
   overlapping the zoomed and aligned wide-view image and tele-view image to output an overlapped image fitting the zoom scale.

2. The method according to claim 1, wherein before the step of capturing a wide-view image and a tele-view image by the wide-angle lens and the telephoto lens respectively according to a capturing setting, the method further comprises:
   receiving a user's adjusting operation to adjust the zoom scale for image capturing and save the adjusted zoom scale to the capturing setting.

3. The method according to claim 2, wherein the step of receiving a user's adjusting operation to adjust the zoom scale for image capturing and saving the adjusted zoom scale to the capturing setting further comprises:
   adjusting a view position for image capturing according to the user's adjusting operation and saving the adjusted view position to the capturing setting.

4. The method according to claim 3, wherein the step of zooming the captured wide-view image and tele-view image to fit the zoom scale according to the ratios further comprises:
   zooming the captured wide-view image and tele-view image with respect to the view position to fit the zoom scale and the view position according to the ratios.

5. The method according to claim 1, wherein the step of calculating ratios of the FOV sizes of the wide-angle lens and the telephoto lens to the zoom scale respectively and zooming the captured wide-view image and tele-view image to fit the zoom scale according to the ratios further comprises:
   calculating ratios of the reduced FOV sizes of the wide-angle lens and the telephoto lens to the zoom scale respectively and zooming the wide-view image and the tele-view image with the reduced FOVs to fit the zoom scale according to the ratios.

6. The method according to claim 1, wherein the step of aligning the zoomed wide-view image and tele-view image according to a shift between the view centers of the wide-angle lens and the telephoto lens further comprises:
   writing the zoomed wide-view image with reduced FOV into a frame buffer; and
   adjusting a position of a center of the zoomed tele-view image with the reduced FOV with respect to a center of the zoomed wide-view image with the reduced FOV according to the shift and accordingly writing the zoomed tele-view image with the reduced FOV into the frame buffer.

7. The method according to claim 1, wherein the step of overlapping the zoomed and aligned wide-view image and tele-view image to output the overlapped image fitting the zoom scale further comprises:
   performing image fusion on an overlapping region between a margin of the zoomed tele-view image with the reduced FOV and an adjacent region of the zoomed wide-view image with the reduced FOV to output a seamlessly overlapped image.

8. An image capturing apparatus, comprising:
a wide-angle lens;
a telephoto lens, wherein a FOV size of the wide-angle lens is larger than a FOV size of the telephoto lens;
a motion sensor, detecting displacements of the wide-angle lens and the telephoto lens when capturing a wide-view image and a tele-view image;
a storage apparatus, storing a plurality of modules; and
a processor, coupled to the wide-angle lens, the telephoto lens, the motion sensor and the storage apparatus, and loading and executing the modules stored in the storage apparatus, wherein the modules comprise:
  an image capturing module, controlling the wide-angle lens and the telephoto lens to capture the wide-view image and the tele-view image respectively according to a capturing setting, wherein the capturing setting includes a zoom scale;
  a shake reduction module, capturing images within reduced FOVs respectively from the wide-view image and tele-view image captured by the wide-angle lens and the telephoto lens according to the displacements of the wide-angle lens and the telephoto lens detected by the motion sensor, wherein centers of the reduced FOVs are at positions where the view centers of the wide-angle lens and the telephoto lens are reversely shifted by the displacements respectively;
  an image zooming module, calculating ratios of the FOV sizes of the wide-angle lens and the telephoto lens to the zoom scale respectively and zooming the captured wide-view image and tele-view image to fit the zoom scale according to the ratios;
  an image aligning module, aligning the zoomed wide-view image and tele-view image according to a shift between view centers of the wide-angle lens and the telephoto lens; and
  an image overlapping module, overlapping the zoomed and aligned wide-view image and tele-view image to output an overlapped image fitting the zoom scale.

9. The image capturing apparatus according to claim 8, further comprising:
an operating apparatus, coupled to the processor, receiving a user's adjusting operation, wherein the image capturing module adjusts the zoom scale for image capturing according to the adjusting operation and saves the adjusted zoom scale to the capturing setting.

10. The image capturing apparatus according to claim 9, wherein the image capturing module further adjusts a view position for image capturing according to the adjusting operation and saving the adjusted view position to the capturing setting.

11. The image capturing apparatus according to claim 10, wherein the image zooming module further zooms the captured wide-view image and tele-view image with respect to the view position to fit the zoom scale and the view position according to the ratios.

12. The image capturing apparatus according to claim 8, wherein the image zooming module comprises calculating ratios of the reduced FOV sizes of the wide-angle lens and the telephoto lens to the zoom scale respectively and zooming the wide-view image and the tele-view image with the reduced FOVs to fit the zoom scale according to the ratios.

13. The image capturing apparatus according to claim 8, further comprising:
a frame buffer, coupled to the processor, wherein the image aligning module comprises writing the zoomed wide-view image with reduced FOV into the frame buffer, and adjusting a position of a center of the zoomed tele-view image with the reduced FOV with respect to a center of the zoomed wide-view image with the reduced FOV according to the shift, and accordingly writing the zoomed tele-view image with the reduced FOV into the frame buffer.

14. The image capturing apparatus according to claim 8, wherein the image overlapping module further performs image fusion on an overlapping region between a margin of the zoomed tele-view image with the reduced FOV and the zoomed wide-view image with the reduced FOV to output a seamlessly overlapped image.

* * * * *